United States Patent [19]
Haider et al.

[11] Patent Number: 5,216,073
[45] Date of Patent: Jun. 1, 1993

[54] THERMOSET LCP BLENDS

[75] Inventors: M. Ishaq Haider, Bernardsville; Vincent J. Sullivan, Madison; Paul N. Chen, Sr., Gillette, all of N.J.; Harry S. Pulaski, Wilkes Barre, Pa.

[73] Assignee: Hoechst Celanese Corp., Somerville, N.J.

[21] Appl. No.: 907,005

[22] Filed: Jul. 1, 1992

[51] Int. Cl.$^5$ .............................................. C08L 67/04
[52] U.S. Cl. ...................................... 525/66; 525/64; 525/68; 525/132; 525/176; 525/190
[58] Field of Search ............... 525/64, 66, 68, 132, 525/176, 190

[56] References Cited

U.S. PATENT DOCUMENTS

| | | |
|---|---|---|
| 4,710,547 | 12/1987 | Uryu et al. .................. 525/437 |
| 4,764,581 | 8/1988 | Muller et al. ................ 528/100 |
| 4,842,924 | 6/1989 | Farris et al. ................. 428/221 |
| 4,948,842 | 8/1990 | Olivier ....................... 525/286 |
| 4,996,262 | 2/1991 | Pyke et al. ................... 525/92 |
| 5,110,866 | 5/1992 | Hongo et al. .................. 525/67 |

*Primary Examiner*—Joseph L. Schofer
*Assistant Examiner*—M. Nagumo
*Attorney, Agent, or Firm*—Joseph M. Mazzarese

[57] ABSTRACT

A moldable thermoset composition comprising about 5-60% liquid crystal polymer and about 95-40% of an epoxy-functional rubber by weight, a process for making and a process for using same. The composition is made by melt mixing the LCP and the epoxy-rubber to form a blend. This blend is then cooled and may be molded, extruded, or otherwise formed into a desired shape. The composition is then heat-treated to make it set.

14 Claims, 6 Drawing Sheets

THERMOSET LCP BLENDS

BACKGROUND OF THE INVENTION

This invention relates to the field of liquid crystal polymer ("LCP") blends, particularly thermoset blends that include an epoxy-functional rubber compound.

Thermoset compositions characteristically cross-link and become hard, or "set", when cured for a sufficient period of time. This change is permanent. Consequently, a molded part made of thermoset resin cannot be reworked. Often it is difficult to produce complex shapes with thermoset plastics because the cross-linking reaction hardens the material before molding can be completed. Advantageously, cured thermoset plastics tend to exhibit good thermal and chemical resistance.

Thermoplastic compositions will flow when heated above their glass transition temperature, or melt transition temperature (if present), and solidify upon cooling, but these changes are reversible. They can be molded into complex shapes and worked into almost any form, e.g. film, fiber, and so forth. The form may not be permanent, however; if the thermoplastic article is heated above its glass or melt transition temperature the plastic will become soft and begin to flow, destroying the shape of the material.

Liquid crystal polymers are generally thermoplastic. They characteristically exhibit a high degree of anisotropy, stiffness and chemical resistance, and can be used to make a wide variety of products.

Epoxy resins generally fall into the category of thermoset compositions, since the highly reactive epoxy moiety tends to undergo irreversible cross-linking reactions. Rubber compounds often do not thermoset, however; these compounds also lack the physical strength and chemical resistance of LCP compounds. Where a rubber compound contains epoxy functional groups, the percentage of epoxy groups in the compound will affect the thermosettability thereof. If a large, bulky rubber compound contains a relatively small number of epoxy groups, it may not thermoset.

U.S. Pat. No. 4,710,547 describes a process for producing a three-dimensionally cross-linked polyester having a liquid crystal structure wherein a thermotropic liquid crystal polyester is combined with a multifunctional species that cross-links the LCP to immobilize the liquid crystal structure.

U.S. Pat. No. 4,842,924 discloses a process for fabricating a composite material made by forming a network of microfibrils made from a rigid-chain polymer, and then interpenetrating the network with two continuous phases, one matrix-forming and the other reinforcing. The rigid-chain polymer may have liquid crystalline properties, while the matrix phase may be a thermostat resin such as an epoxy resin.

U.S. Pat. No. 4,764,581 discloses liquid crystalline diglyceridyl compounds of optionally ring-substituted 4-hydroxyphenyl 4-hydroxybenzoates, and epoxy resin mixtures containing those compounds.

SUMMARY OF THE INVENTION

The present invention is a moldable thermoset composition comprising about 5-60% liquid crystal polymer and about 95-40% of an epoxy-functional rubber by weight, a process for making and a process for using same. The composition is made by melt mixing the LCP and the epoxy-rubber to form a blend which is then cooled and may be molded, extruded, or otherwise formed into the desired shape. The composition is then heat-treated to make it set.

It is an object of the present invention to provide an LCP blend that is thermosettable.

It is another object of the present invention to provide an impact-modified LCP blend having superior mechanical properties.

It is also an object of this invention to make a composition that has some of the properties of an LCP and is less expensive.

A further object of the present invention is to provide a composition that has some of the properties of an LCP but can be used at higher temperatures than the LCP itself.

It is another object of the present invention to provide a composition that may be molded essentially like a thermoplastic and then may be thermoset.

Other objects and advantages of the present invention will be apparent to those skilled in the art from the following description and the appended claims.

DETAILED DESCRIPTION OF THE PREFERRED EMBODIMENTS

Figure 1:
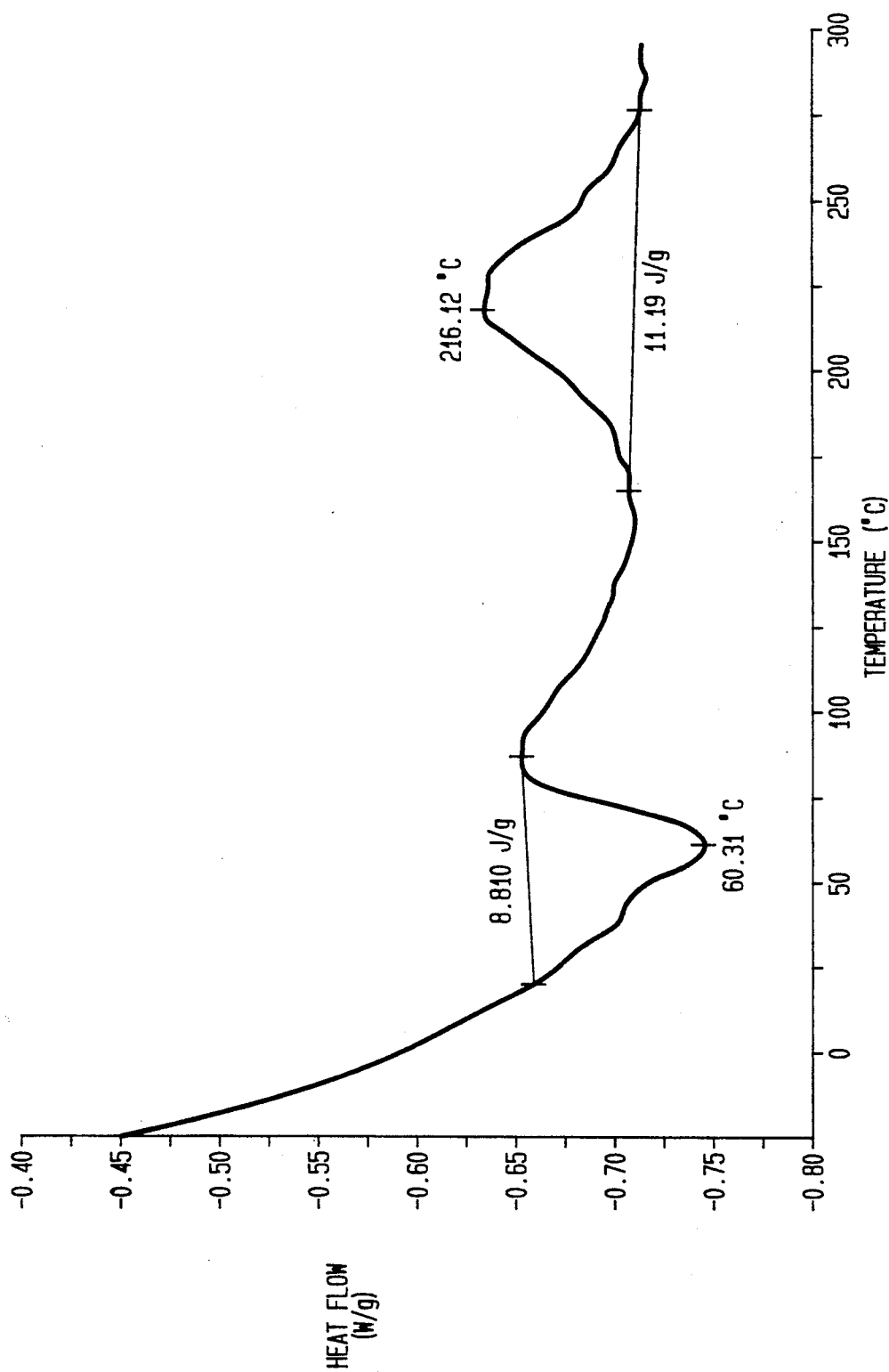
FIG. 1 is a DSC plot showing calorimetric changes in a blend of the present invention as it is cured by gradual heating.

An LCP thermoplastic in the form of a dry powder is mixed with an epoxy-functional rubber compound in dry powder form. The mixture is melt mixed in a conventional apparatus, e.g. a Haake mixing bowl, at a temperature high enough to melt both powders, e.g. above about 280° C., until well blended. Typically, the batch melt mixing can be accomplished in about 5 minutes at 100 rpm for small batches (e.g. 70 grams). The blend may be prepared in an extruder, cooled, and then chipped into small pieces or ground into powder. This composition behaves like a thermoplastic at room temperature and may be molded into virtually any shape. For example, it may be used to form films, fibers, molded articles, and so forth.

Although the polymers are preferably in dry powder form before melt blending, other physical forms may be used. The polymers may be in any form amenable to melt blending. However, LCP's lose some of their properties due to degradation when melt mixed wet, so it is best to dry both polymers before mixing to obtain the best LCP blend properties.

Surprisingly, although the LCP and epoxy-rubber compound each exhibit thermoplastic behavior when used separately, the blended composition may be cured by heat treatment as is conventionally done with thermoset compositions. Generally, the composition is heated in an oven gradually to a temperature of about 200°–225° C. or more and held at the elevated temperature for about 5 minutes or more until the cross-linking reaction has proceeded sufficiently to completely set the composition. The heat-treated composition will no longer melt and will retain its structure and properties at relatively high temperatures, e.g. about 300°–375° C. or more.

It is not necessary to reach a temperature of about 200°–225° C. to cure or set the composition; heating to lower or higher temperatures is within the scope of this invention. The key is to heat the composition for a sufficient time and at a sufficient temperature to thermoset the blend. There is no special requirement for the heating rate, final temperature, or cure time for setting the composition. The optimal choice for each of these parameters will depend on the other parameters and on the exact composition of the blend. Those skilled in the art will be able to perform an effective heat treatment to set the compositions of this invention.

Compositions comprising a relatively higher percentage of LCP will exhibit a greater degree of LCP properties, whereas using relatively more epoxy-rubber lowers the cost of the composition. Greater cross-linking will be expected when the percentages of the polymers in the blend approximately match. Blend compositions having about 30–60% by weight LCP, and preferably above about 50% LCP, are best when a high degree of LCP character is needed, whereas about 20–50% LCP is desirable to keep costs down yet provide a composition having good strength and chemical resistance. Compositions containing about 30–60% LCP are preferred for most applications, although the blend composition should be tailored to fit the desired application.

Virtually any LCP, or combination of LCP's, may be used in the practice of this invention. Many such polymers and methods for making them are known to those skilled in the art. One preferred type of LCP is VECTRA ® A resin, a polymer comprising monomer units derived from 4-hydroxybenzoic acid (73 mole %) and 6-hydroxy-2-naphthoic acid (27 mole %) (available from Hoechst Celanese Corp.); two particularly preferred grades of this polymer are VECTRA ® A910 and VECTRA ® A950. Other preferred LCP's available from Hoechst Celanese Corp. include VECTRA ® B resin, a polymer comprising monomer units derived from 6-hydroxy-2-naphthoic acid (60 mole %), terephthalic acid (20%), and p-acetaminophenol (20%), VECTRA ® C resin, a polymer comprising monomer units derived from 4-hydroxybenzoic acid (80%) and 6-hydroxy-2-naphthoic acid (20%), and VECTRA ® E resin, a polymer comprising monomer units derived from 4-hydroxybenzoic acid (60 mole %), 6-hydroxy-2-naphthoic acid (5%), terephthalic acid (17.5%), and biphenol (17.5%). It is also within the scope of the present invention to make LCP blends containing a non-LCP polymer (e.g., LCP+epoxy rubber+non-LCP). These blends could include any non-LCP compatible with the LCP in the blend, including aliphatic or aromatic polyesters or polyarylates, or the like.

The epoxy-functional rubber compound of the present invention is a bulky rubber polymer having one or more epoxy groups, but not so many that the rubber polymer alone will thermoset. Preferably, the epoxy-rubber compounds of the present invention are polymers having a polyolefin main chain bonded to epoxy-containing side chain groups which are preferably epoxy-functional vinyl polymer side chain groups. Examples of epoxy-rubber compositions useful in the practice of this invention include LOTADER TM AX 8660, a terpolymer of ethylene, glycidyl methacrylate and acrylate units (available from the Norsolor company of France), and MODIPER TM A Series graft copolymers containing epoxy functional groups (available from the Nippon Oil & Fats Co., Ltd. of Tokyo, Japan), such as MODIPER TM A-4100, an ethylene glycidyl methacrylate copolymer (85/15 w/w) graft polymerized with polystyrene (30% by weight), MODIPER TM A-4200, an ethylene glycidyl methacrylate copolymer (85/15 w/w) graft polymerized with polymethylmethacrylate (30% by weight), MODIPER TM A 4400, an ethylene glycidyl methacrylate copolymer (85/15 w/w) graft polymerized with polyacrylonitrile-styrene (30% by wt), and the like.

The following Examples are presented to illustrate the present invention, but should not be construed as limiting the scope of this invention.

EXAMPLE I

A mixture of 50% LOTADER TM AX 8660 and 50% VECTRA ® A910 (vacuum dried at 125° C.) was melt mixed using a Haake batch mixer at 280° C. and 100 rpm for 10 minutes. After cooling, the blend was ground into a powder and was heated in a differential scanning calorimeter ("DSC") at a rate of 20° C./minute from a starting temperature of −25° C. to a final temperature of 300° C. and then allowed to cool. FIG. 1 shows a DSC plot of the thermal changes the blend underwent during this heat treatment. An endothermic peak in the plot at around 60° C. marks the melting point of the rubber compound. An exotherm at 216° C. shows that a cross-linking reaction is produced during heat treatment.

Figure 2:
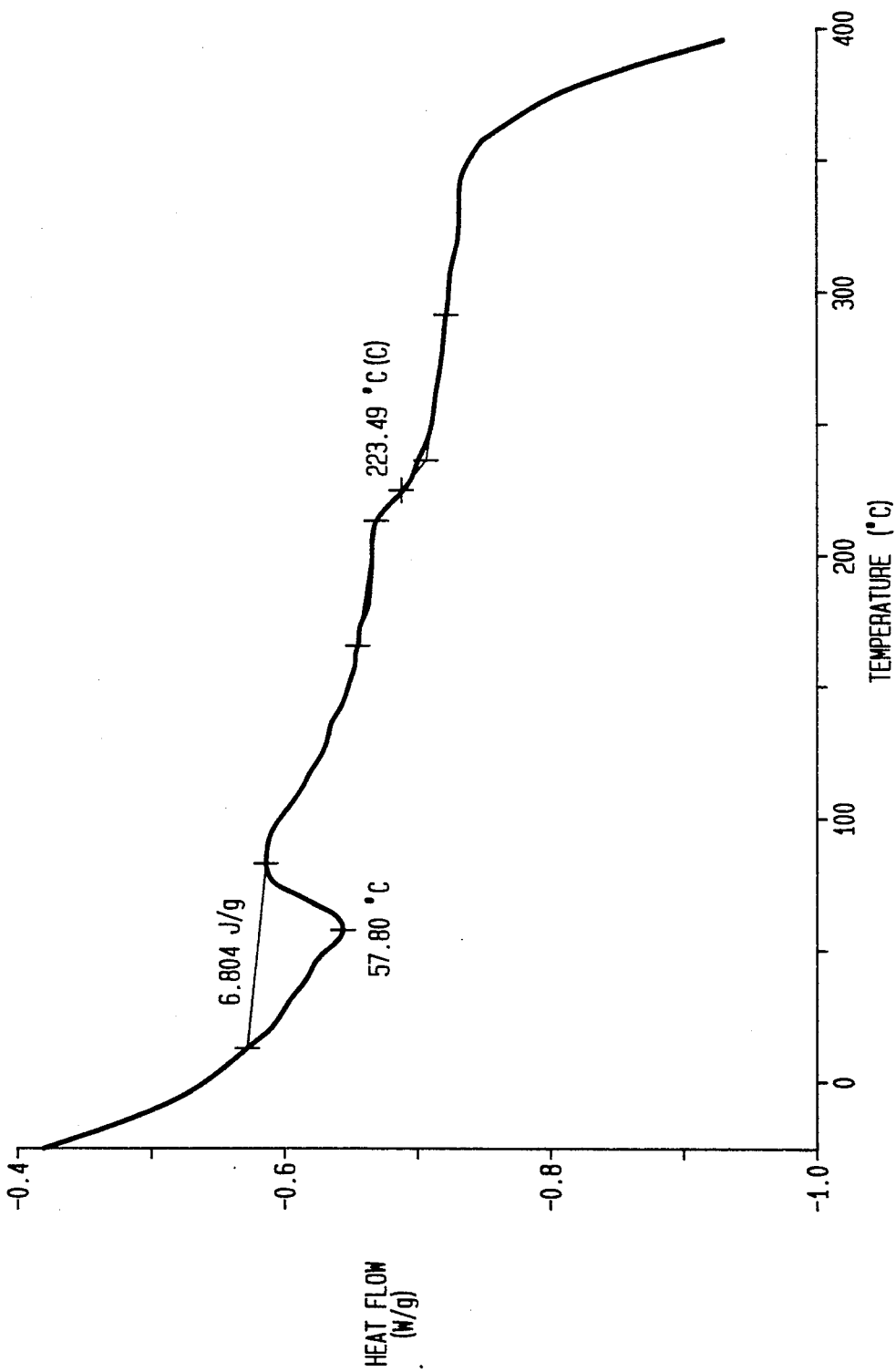
FIG. 2 is a DSC plot showing calorimetric changes in the blend of FIG. 1 during a second heating after the composition has set.

The cooled, heat treated composition was then heated a second time at a rate of 20° C./minute from a starting temperature of −10° C. to a final temperature of 400° C. FIG. 2 records the DSC results for this heat treatment. The rubbery component endotherm is still evident at about 58° C.; however, the absence of both an LCP melt endotherm and a cross-linking reaction exotherm indicates that the material has thermoset and will not melt. FIG. 2 also shows a glass transition temperature of about 223.5° C. for the thermoset material, significantly higher than that of the unblended LCP (about 100° C.). Visual observation also confirmed that the blend remained in a solid state. The composition began to degrade as the temperature approached about 350° C., as shown by the continuous drop in the DSC curve.

EXAMPLE II

Figure 5:
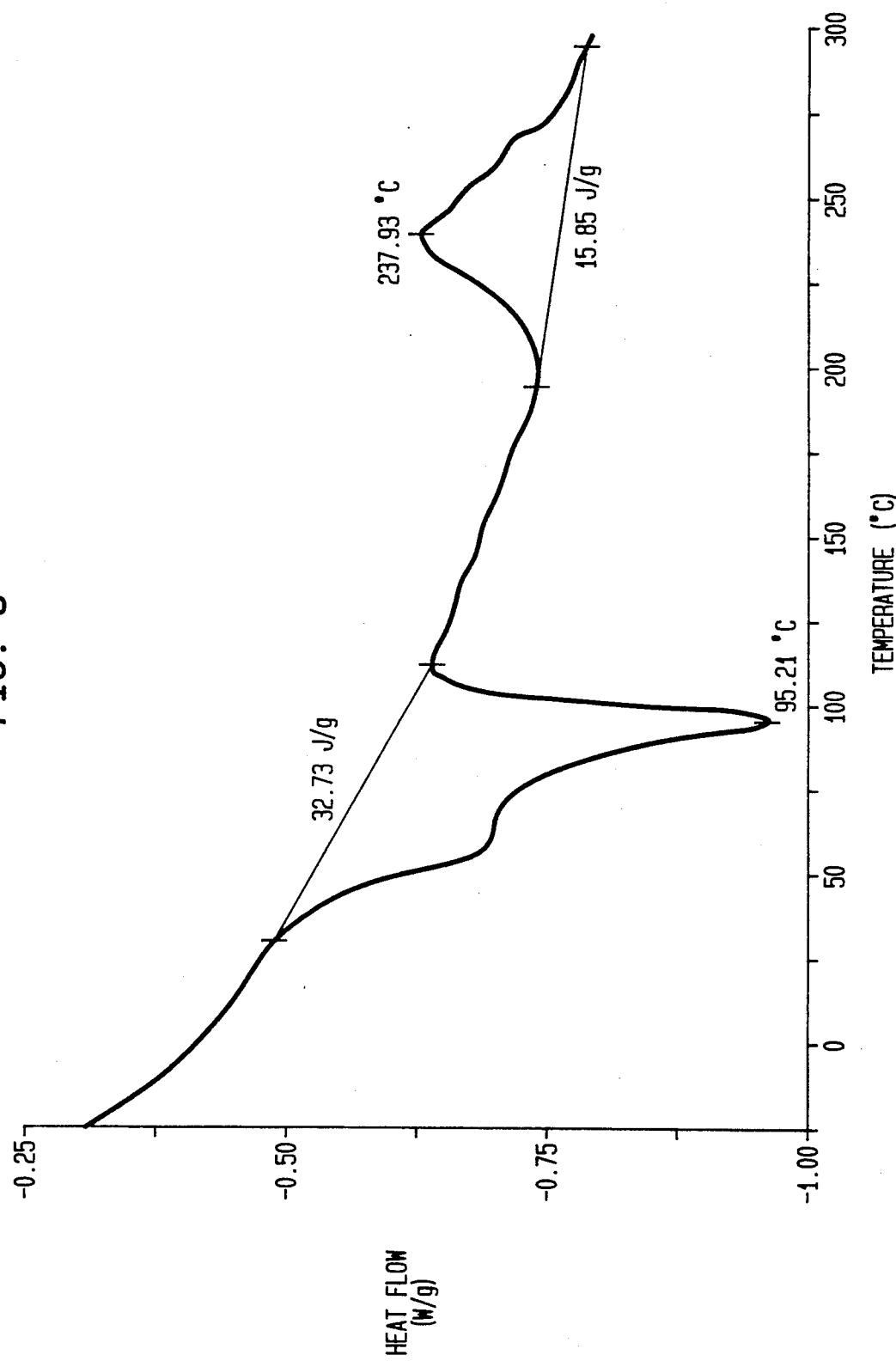
FIG. 5 is a DSC plot showing calorimetric changes in another blend of the present invention as it is cured by gradual heating.
Figure 6:
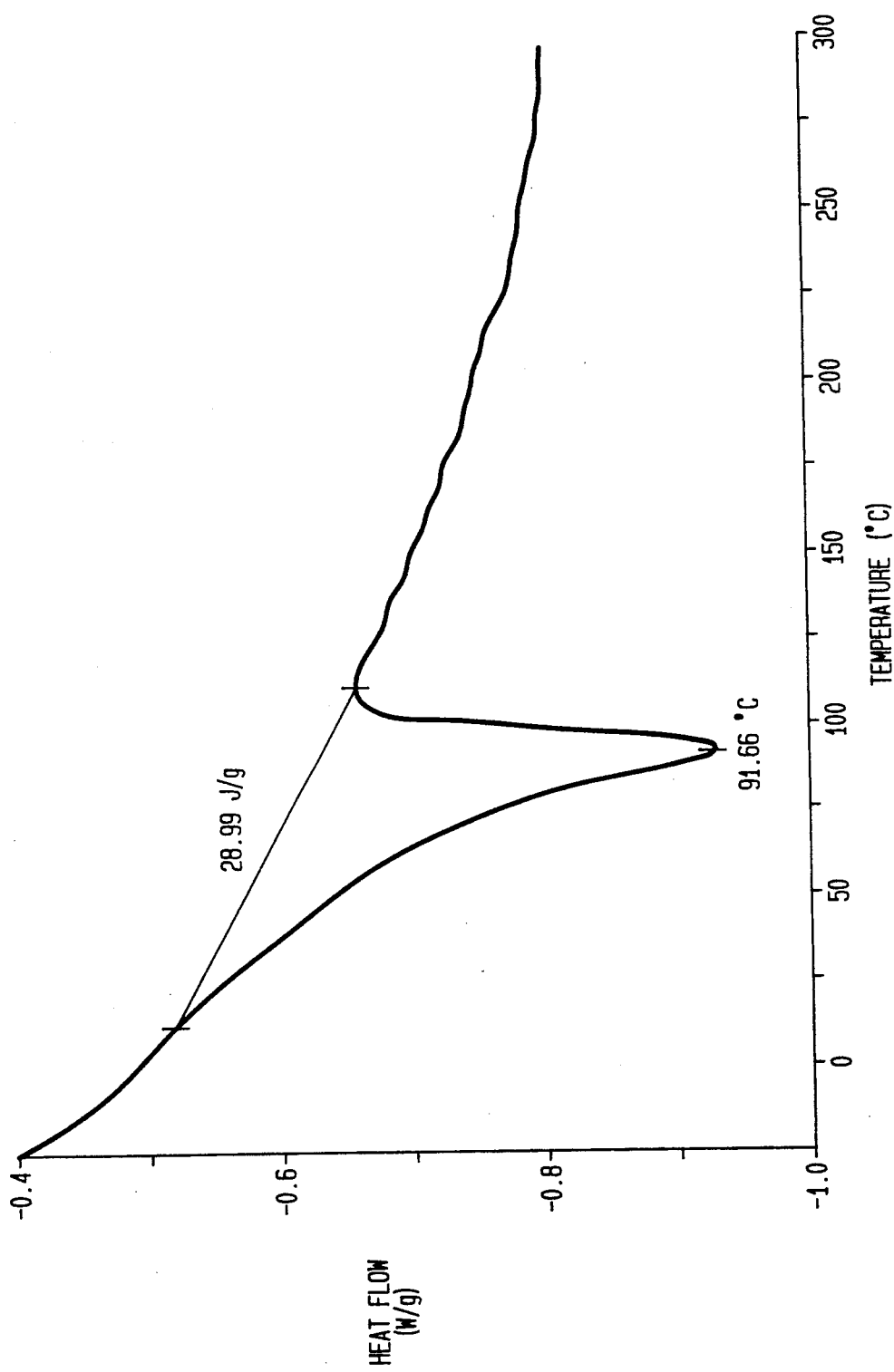
FIG. 6 is a DSC plot showing calorimetric changes in the blend of FIG. 5 during a second heating after the composition has set.

A mixture of 50% MODIPER A4200 and 50% VECTRA ® A910 (vacuum dried at 125° C.) was melt mixed using a Haake batch mixer at 280° C. and 100 rpm for 10 minutes. The blend was removed from the mixer, allowed to cool, ground into powder, and then calendered into films at a roll temperature of 308° C., a roll pressure of 1000 psig, and a roll speed of 0.5 meter/min. FIG. 5 shows the results of DSC analysis of this film: a melt endotherm feature is evident at about 95° C., and a cross-linking reaction exotherm feature is evident at about 238° C. The films were thermoset by heating in a nitrogen atmosphere at 300° C. for 5 minutes. The now-thermoset material was cooled and reheated to record a new DSC curve (FIG. 6); this time the melt endotherm is about 92° C. and there is no exothermic peak or apparent glass transition temperature. The thermal stability of the material appears to be superior to neat LCP.

EXAMPLE III

A 50/50 (w/w) blend of LOTADER ™ AX8660 and VECTRA ® A910 was prepared by physically mixing particles of each. The mixture of solid particles was then dried overnight at 100° C. in a vacuum oven. The dried mixture was blended in a conventional twin screw melt extrusion apparatus, then extruded in the form of a strand which was cooled and solidified in a water trough and chopped into pellets. The pellets were dried overnight at 100° C. in a vacuum oven. The pellets were heated to their melt temperature (280°-300° C.) and injection molded at 10,000 psi; the mold cavity was held at 95° C., with a cycle time of about 40 seconds. The molded articles (tensile bars) were heat treated at 250° C. from 2 hours under a nitrogen atmosphere in a circulating oven to thermoset the blend. The thermoset bars exhibited lower mechanical properties than neat LCP, but higher thermal stability. Dynamic mechanical Analysis showed that the storage modulus for the molded bars was stable up to about 265° C., whereas the neat LCP is stable to about 255° C.

Figure 3:
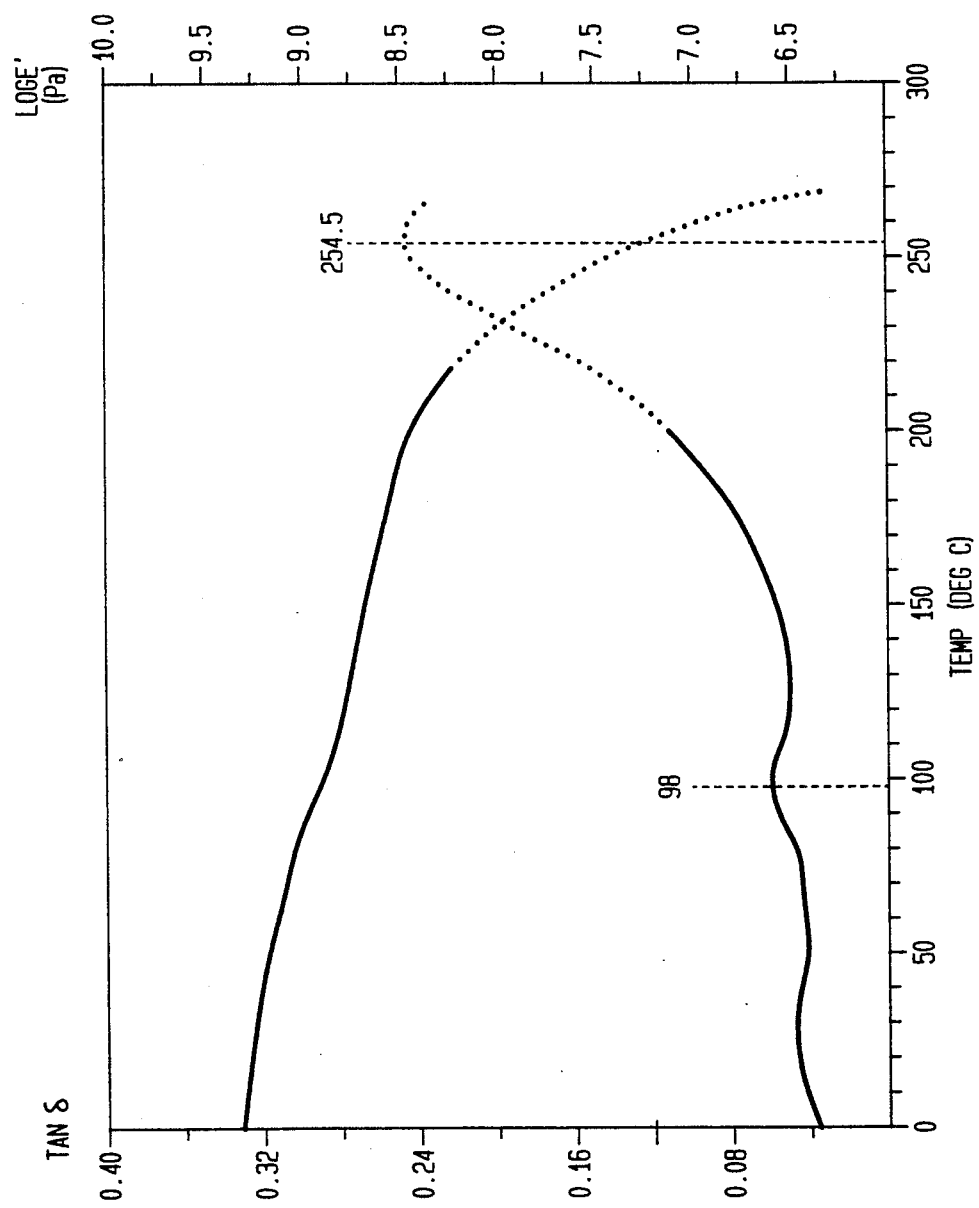
FIG. 3 is a DMTA of a neat LCP showing its glass and melt transition temperatures.
Figure 4:
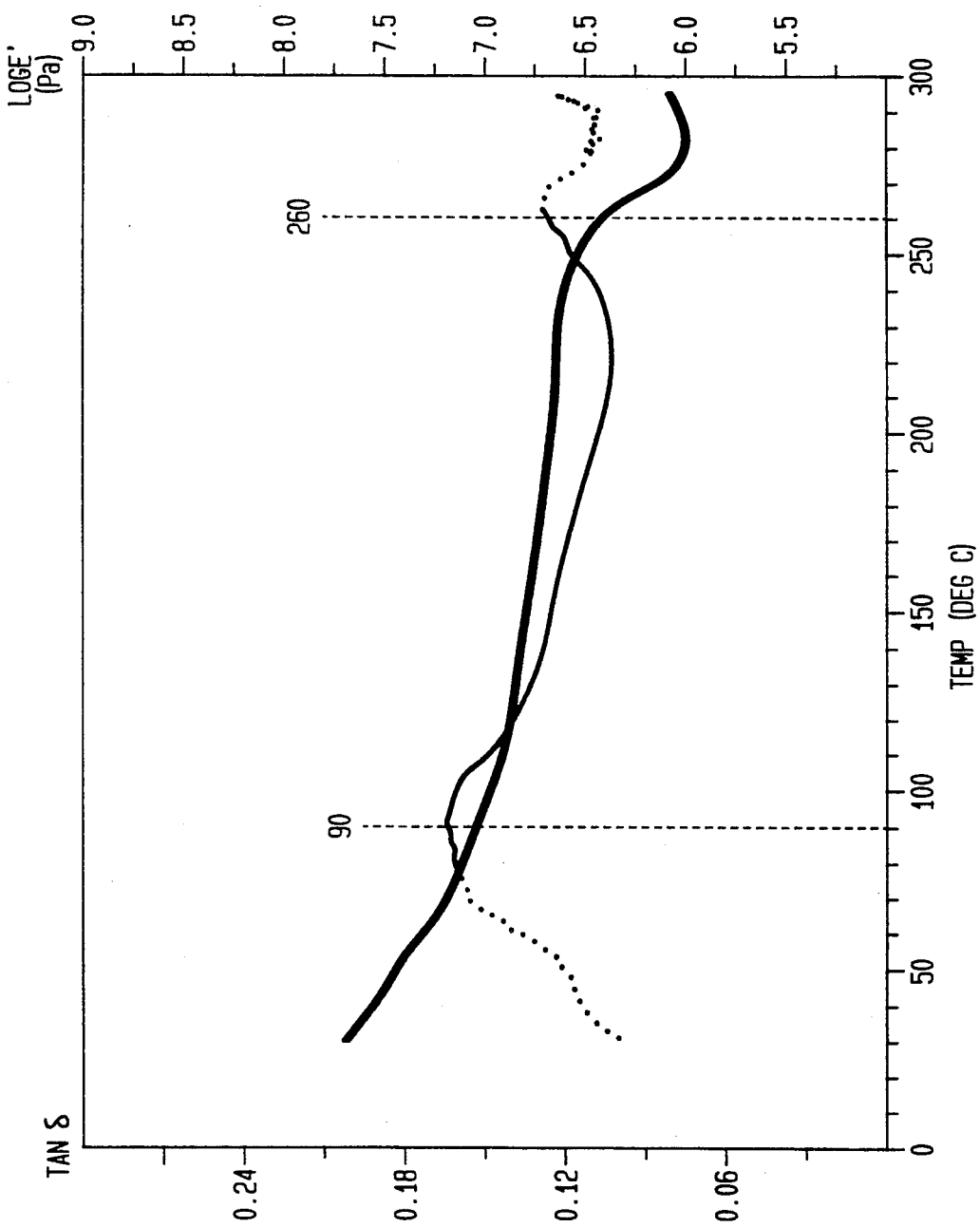
FIG. 4 is a DMTA of a blend of this invention containing the LCP of FIG. 3 showing transition peaks and modulus changes during heating.

FIG. 3 shows the results of a dynamic mechanical thermal analysis ("DMTA") of neat VECTRA ® LCP. The tan δ curve shows a glass transition at about 98° C. and a melting transition at about 254°-5° C. The log E' curve shows that the modulus falls off precipitously as the LCP melts. FIG. 4 shows the DMTA results for the initial heating of the blend. There is a peak around 90° C. where the blend undergoes a transition; at about 260° C. the blend shows a transition which is normally associated with melting; however, the modulus shows a new plateau at temperatures above this transition, indicating the occurrence of crosslinking. The modulus further increases at still higher temperatures as the blend components react and thermoset.

Many variations of the present invention not illustrated herein will occur to those skilled in the art. The present invention is not limited to the embodiments illustrated and described herein, but encompasses all the subject matter within the scope of the appended claims.

We claim:
1. A moldable thermoset composition comprising:
   about 5-60% by weight liquid crystal polymer; and,
   about 95-40% by weight of an epoxy-functional rubber compound,
wherein said liquid crystal polymer and said epoxy-functional rubber compound have been combined and then melt mixed until well-blended.

2. The composition of claim 1 wherein said epoxy-functional rubber compound is a polyolefin having epoxy-functional side chains.

3. The composition of claim 2 wherein said epoxy-functional side chains are epoxy-containing vinyl polymer groups.

4. The composition of claim 1 wherein said epoxy-functional rubber compound is a terpolymer of ethylene, glycidyl methacrylate and acrylate units.

5. The composition of claim 1 wherein said epoxy-functional rubber compound is an ethylene glycidyl methacrylate copolymer (85/15 w/w) copolymer grafted with 30% by weight of any of polystyrene, polymethylmethacrylate, or polyacrylonitrle-styrene.

6. The composition of claim 1 wherein said liquid crystal polymer is an aromatic polyester.

7. The composition of claim 1 wherein said liquid crystal polymer is chosen from the group consisting of: a polymer comprising monomer units derived from 4-hydroxybenzoic acid (73 mole %) and 6-hydroxy-2-naphthoic acid (27 mole %); a polymer comprising monomer units derived from 6-hydroxy-2-naphthoic acid (60 mole %), terephthalic acid (20 mole %), and p-acetaminophenol (20 mole %); a polymer comprising monomer units derived from 4-hydroxybenzoic acid (80 mole %) and 6-hydroxy-2-naphthoic acid (20 mole %); and a polymer comprising monomer units derived from 4-hydroxybenzoic acid (60 mole %), 6-hydroxy-2-naphthoic acid (5 mole %) terephthalic acid (17.5 mole %) and biphenol (17.5 mole %).

8. The composition of claim 7 wherein said liquid crystal polymer is chosen from the group consisting of: a polymer comprising monomer units derived from 1-hydroxybenzoic acid (73 mole %) and 6-hydroxy-2-naphthoic acid (27 mole %).

9. The composition of claim 1 wherein said liquid crystal polymer content is between about 30% and about 60% by weight.

10. The composition of claim 1 wherein said liquid crystal polymer content is between about 20% and about 50% by weight.

11. The composition of claim 1 wherein said liquid crystal polymer content is at least about 50% by weight.

12. The composition of claim 1 wherein said liquid crystal polymer content is between about 30% and about 50% by weight.

13. A thermoset article comprising a composition according to claim 1 wherein said composition has been cured by heat treatment until said composition has set.

14. A thermoset article according to claim 13 wherein said heat treatment comprises heating said composition to a temperature of at least about 200° C. and maintaining said temperature for at least about 5 minutes.

* * * * *